US009700962B2

(12) United States Patent
Yang et al.

(10) Patent No.: US 9,700,962 B2
(45) Date of Patent: Jul. 11, 2017

(54) LONGITUDINAL METAL PLATE LOADING/UNLOADING AND CUTTING METHOD AND SYSTEM THEREOF

(71) Applicant: BAOSHAN IRON & STEEL CO., LTD., Shanghai (CN)

(72) Inventors: Saidan Yang, Shanghai (CN); Junliang Qiao, Shanghai (CN); Wenhai Jin, Shanghai (CN); Shengbo Pan, Shanghai (CN); Ruimin Wu, Shanghai (CN); Chengguo Jin, Shanghai (CN); Yuming Wang, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 65 days.

(21) Appl. No.: 14/759,461

(22) PCT Filed: Apr. 28, 2014

(86) PCT No.: PCT/CN2014/076353
§ 371 (c)(1),
(2) Date: Jul. 7, 2015

(87) PCT Pub. No.: WO2014/177035
PCT Pub. Date: Nov. 6, 2014

(65) Prior Publication Data
US 2016/0039050 A1    Feb. 11, 2016

(30) Foreign Application Priority Data

Apr. 28, 2013    (CN) .......................... 2013 1 0157671

(51) Int. Cl.
*B23K 26/00* (2014.01)
*B23K 26/02* (2014.01)
(Continued)

(52) U.S. Cl.
CPC .......... *B23K 26/38* (2013.01); *B23K 26/0846* (2013.01); *B23K 26/0884* (2013.01);
(Continued)

(58) Field of Classification Search
CPC .............. B23K 26/0604; B23K 26/083; B23K 26/0838; B23K 26/0846; B23K 26/38;
(Continued)

(56) References Cited

U.S. PATENT DOCUMENTS

| | | | | |
|---|---|---|---|---|
| 4,392,766 A | * | 7/1983 | Blunt | B25J 9/045 271/107 |
| 5,229,571 A | * | 7/1993 | Neiheisel | B23K 26/10 219/121.63 |

(Continued)

FOREIGN PATENT DOCUMENTS

| | | |
|---|---|---|
| CN | 101985188 A | 3/2011 |
| CN | 201950381 U | 8/2011 |

(Continued)

OTHER PUBLICATIONS

PCT International Search Report, PCT/CN2014/076353, Jul. 25, 2014, 4 pages.

*Primary Examiner* — Sang Y Paik
(74) *Attorney, Agent, or Firm* — Quarles & Brady LLP (57) ABSTRACT

A longitudinal metal plate loading/unloading and cutting method and a system thereof involve two longitudinally moving loading/unloading and cutting operation lines arranged in parallel, each of the operation lines comprising a block loading station, a cutting station, a sheet unloading station, and a carrying and stacking robot arranged between the two operation lines, which are arranged in succession, wherein the two operation lines have block loading directions opposite to each other. The present invention can
(Continued)

effectively increase the cutting production rate and yield, and also provide a more reasonable layout of the system.

11 Claims, 4 Drawing Sheets (51) Int. Cl.
    *B23K 26/38*        (2014.01)
    *B23K 26/08*        (2014.01)
    *B23K 37/00*        (2006.01)
    *B23K 37/02*        (2006.01)
    *B23K 26/40*        (2014.01)
    *B23K 26/70*        (2014.01)
    *B23K 101/18*      (2006.01)
    *B23K 103/04*      (2006.01)
(52) U.S. Cl.
    CPC ............ *B23K 26/40* (2013.01); *B23K 26/702* (2015.10); *B23K 37/00* (2013.01); *B23K 37/0235* (2013.01); *B23K 2201/18* (2013.01); *B23K 2203/04* (2013.01)
(58) Field of Classification Search
    CPC ........ B23K 37/0211–37/0223; B23K 37/0229; B23K 37/0408; B23K 2201/18; B23K 2203/04; B23K 26/0884; B23K 26/40; B23K 26/702; B23K 37/00; B23K 37/0235
    USPC .......................................... 219/121.6–121.83
    See application file for complete search history.

(56) References Cited

U.S. PATENT DOCUMENTS

| | | | | |
|---|---|---|---|---|
| 5,326,218 A * | 7/1994 | Fallas | ..................... | B25J 9/106 414/733 |
| 5,637,243 A * | 6/1997 | Sato | ..................... | B23K 26/706 219/121.67 |
| 6,046,428 A * | 4/2000 | Serruys | ............. | B23K 26/0838 219/121.67 |
| 2002/0084259 A1* | 7/2002 | Bertuzzi | ................ | B23K 10/00 219/121.39 |
| 2003/0178398 A1* | 9/2003 | Nagatoshi | .............. | B23K 26/04 219/121.77 |
| 2005/0045606 A1* | 3/2005 | Ito | ..................... | B23K 26/0838 219/121.73 |
| 2007/0199929 A1 | 8/2007 | Rippl et al. | | |
| 2007/0257012 A1* | 11/2007 | Wile | .................. | B23K 26/0673 219/121.7 |
| 2010/0122970 A1* | 5/2010 | Caristan | ................ | B23K 26/38 219/121.72 |

FOREIGN PATENT DOCUMENTS

| | | |
|---|---|---|
| CN | 102452002 A | 5/2012 |
| CN | 103600170 A | 2/2014 |
| DE | 102008011232 A1 | 8/2008 |

* cited by examiner

LONGITUDINAL METAL PLATE LOADING/UNLOADING AND CUTTING METHOD AND SYSTEM THEREOF

CROSS-REFERENCE TO RELATED APPLICATIONS

This application represents the national stage entry of PCT international Application No. PCT/CN2014/076353 filed Apr. 28, 2014, which claims priority of Chinese Patent Application No. 20131015761.4 filed Apr. 28, 2013, the disclosures of which are incorporated by reference here in their entirety for all purposes.

FIELD OF THE INVENTION

The present invention relates to the metal machining field and more specifically to a metal plate loading/unloading and cutting method and a system thereof in the technical field of automobile manufacturing.

BACKGROUND

The laser technique used in the material cutting machining field is a mature commercial technique, and the development of laser generators results in a higher machining speed and a more flexible application method, and also poses a demand on an automatic loading/unloading, high-speed continuous production. With the development of robots and control technologies, carrying and loading/unloading systems developed based on robot automation control are being improved. With this background, an integrated system for loading and unloading and also cutting can greatly satisfy the machining requirements from customers. For example, the patent CN 102105256 A to Automatic Feed Company provides a progressive laser cutting device for high-speed cutting. In the device provided therein, on each portal frame, at least one movable laser head performs a laser cutting operation.

The techniques already in use include a transverse double-quick-table metal plate loading/unloading and cutting method, in which due to the use of transverse quick tables, the moving directions of the quick tables when feeding and discharging are perpendicular to a waste material discharging direction, thus increasing the operation space of the whole system. In addition, each quick table has a cutting station and two block loading stations and sheet unloading stations, and correspondingly has two block cart stacking stations and sheet cart stacking stations; four carts are provided for each set of guide rails, making the control and design of the carrying and stacking units relatively complicated. In this way, a long transverse length is occupied, so that the plane layout of the plant is limited.

Moreover, during the of the transverse quick table movement, the span spacing of the guide rails of the quick table is related to the length of the sheets, and in order to accommodate sheets of various specifications, the quick table should have a span spacing of at least 4,000 mm, which poses a high requirement on machining precision and installation conditions. A narrower spacing of the guide rails of the quick table can better ensure the machining and installation precision and improve operation performance. For a longitudinally moving quick table, the span of the guide rails thereof is related to the width of the sheets, i.e., related to the width of steel strips, which is generally between 1500-1800 mm, and thus a span of 2000 mm at maximum of guide rails of the quick table can satisfy the manufacture requirements and greatly ensure the machining quality and installation precision, so as to improve the operation stability.

SUMMARY

An object of the present invention is to provide a longitudinal metal plate loading/unloading and cutting method and a system thereof, which can implement steel plate loading and unloading and effectively increase the production rate and yield, and moreover, the system has good reliability and a more reasonable layout.

To achieve the above-mentioned object, a technical solution of the present invention is provided as follows.

A metal plate cutting system comprises two longitudinally moving loading/unloading and cutting operation lines arranged in parallel. Each of the operation lines comprise a block loading station, a cutting station, a sheet unloading station, and a carrying and stacking robot with a corresponding external shaft disposed between the two operation lines, which are arranged in succession, wherein the block loading stations of the two operation lines are disposed in opposite directions, i.e., the block loading directions are opposite to each other. The block loading station and the sheet unloading station are respectively provided with a block cart and a sheet cart and corresponding guide rails. The cutting station is provided with at least one laser generator, two laser cutting heads, and a moving quick table for moving blocks and sheets into and out of a cutting region of the laser cutting head; the moving quick tables move longitudinally and allow feeding and discharging in two directions, and are each provided with two waiting stations and a cutting station therebetween. The external shafts of the carrying and stacking robots of the two operation lines respectively extend over the block loading station of the respective operation line and one waiting station of the corresponding moving quick table at the block unloading station side and correspondingly, also extend over the sheet unloading station of the other operation line and one waiting station of the corresponding moving quick table at the sheet unloading station side. The carrying and stacking robots are each provided with an end effector for grasping a block and a sheet; and each cutting station is provided with a waste material conveying system.

Furthermore, a replaceable liner die is provided at the cutting station, a support device is disposed on the liner die below the position corresponding to the sheets and the recyclable waste material, and the rest of the liner die is a hollow left for blanking.

The waste material conveying system comprises a waste material chute for blanking and a waste material conveying belt.

The waste material discharging direction of the waste material conveying system is perpendicular to the moving direction of the moving quick table.

There are two laser generators each corresponding to one laser cutting head.

The laser generator is an optical fiber laser generator or a disc laser generator.

The cutting station is provided with at least one segmented flue for isolating and drawing away smoke by way of segmented opening and closing.

A metal plate cutting method of the present invention uses two longitudinally moving loading/unloading and cutting operation lines arranged in parallel, each of the operation lines comprising a block loading station, a cutting station, a sheet unloading station, and a carrying and stacking robot disposed between two operation lines, which are arranged in succession, wherein the two operation lines have block loading directions opposite to each other; the block loading station and the sheet unloading station are respectively provided with a block cart and a sheet cart and corresponding guide rails; the cutting station is provided with at least one laser generator, two laser cutting heads, and a moving quick table for moving blocks and sheets into and out of a cutting region; the moving quick tables move longitudinally and allow feeding and discharging in two directions from two sides, and are each provided with two waiting stations and a cutting station; stacked blocks are carried by the block cart to the block loading station, the carrying and stacking robot loads a block to a waiting station of the moving quick tables, and the moving quick tables move the block to the cutting station; and the laser cutting head cuts the block along a predetermined cutting path, the moving quick table moves a sheet out of the cutting station after cutting, the carrying and stacking robot unloads the sheet to the sheet unloading station, stacked sheets are carried out of the operation region by the sheet cart along the guide rails, and the cut-away waste material is removed to the outside of the cutting station by a waste material conveying system.

Further, the external shafts of the carrying and stacking robots of the two operation lines respectively extend over the block loading station of the respective operation line and a waiting station of the moving quick table at the side close to the block loading station; and the carrying and stacking robot of each operation line performs block loading and sheet unloading operations to the other operation line, so that the two operation lines share one sheet unloading station.

Either of the carrying and stacking robots of the two operation lines is responsible for the block loading and sheet unloading operations at one side of the two moving quick tables.

A replaceable liner die is provided at the cutting station, a support device is disposed on the liner die below the position corresponding to the sheets and the recyclable waste material, and the rest of the liner die is a hollow left for blanking.

The material discharging direction of the waste material conveying system is perpendicular to the moving direction of the moving quick table.

A moving mechanism of the laser cutting head is in the form of a rectangular-coordinate robot, and is movable in X-, Y- and Z-direction.

The beneficial effects of the present invention are as follows:

with the present invention, the system has a more compact layout, the moving quick tables move longitudinally so as to shorten the transverse length, not only reducing the occupied area but also ensuring the machining and installation quality, so that in this way the entire system can operate more stably so as to achieve a high-quality cutting operation. Furthermore, the two moving quick tables can share one block stacking station and one sheet stacking station at one side, reducing the number of stacking stations, simplifying the robot control operation system and the conveying system, and making the operation more convenient.

DETAILED DESCRIPTION

Figure 1:
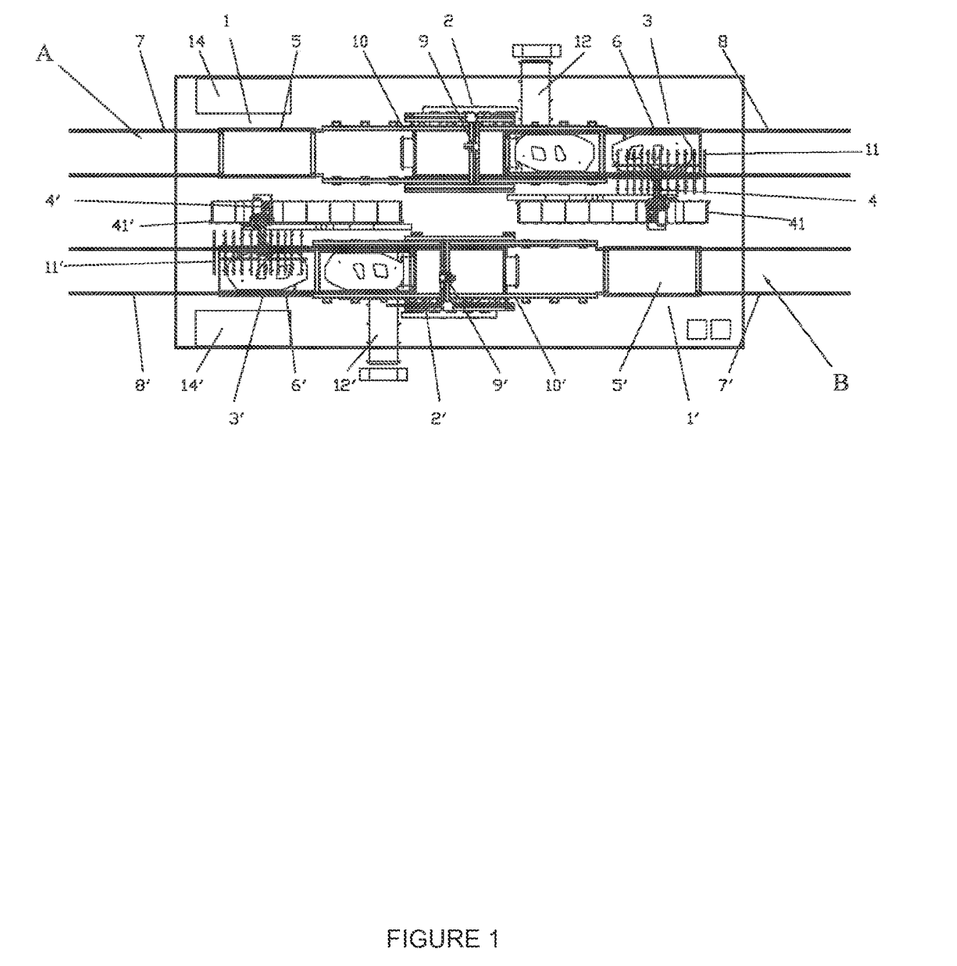
FIG. 1 is a top view according to an embodiment of the present invention.
Figure 2:
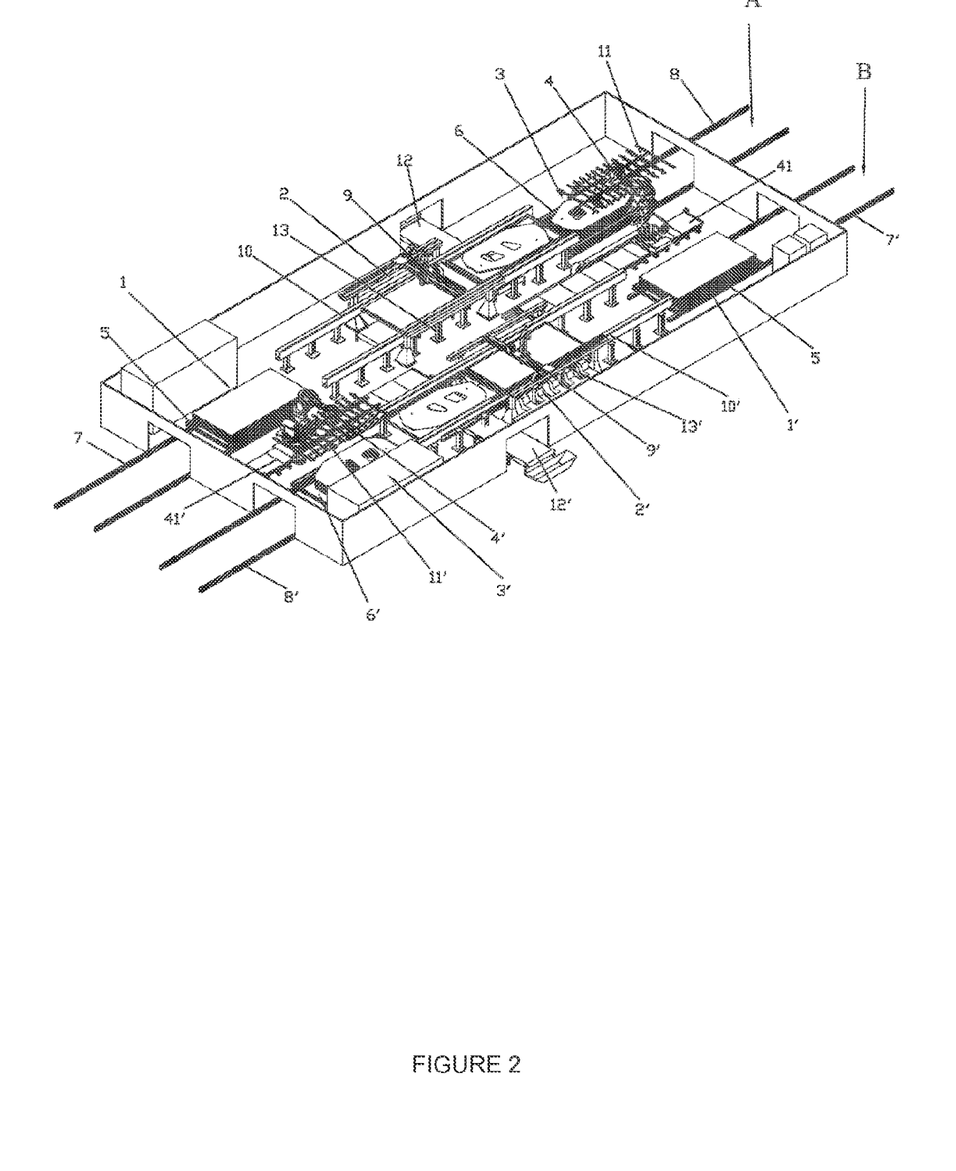
FIG. 2 is perspective schematic view according to an embodiment of the present invention.

Referring to FIGS. 1 and 2, a metal plate cutting system according to the present invention includes two longitudinally moving loading/unloading and cutting operation lines A, B, each of the operation lines A, B comprising a block loading station 1, 1', a cutting station 2, 2', a sheet unloading station 3, 3', and a carrying and stacking robot 4, 4' with a corresponding external shaft 41, 41' arranged between the two operation lines, which are arranged in succession, wherein the block loading stations 1, 1' of the two operation lines A, B are arranged in opposite directions; the block loading station 1, 1' and the sheet unloading station 3, 3' are respectively provided with a block cart 5, 5' and a sheet cart 6, 6' and corresponding guide rails 7, 7', 8, 8'; the cutting station 2, 2' is provided with at least one laser generator and two laser cutting heads 9, 9' and a moving quick table 10, 10' for moving blocks and sheets into and out of a cutting region; and the moving quick tables 10, 10' move longitudinally and allow feeding and discharging in two directions from two sides, and is each provided with two waiting stations (i.e., waiting stations 1# and 2#) and a cutting station.

The external shafts 41, 41' of the carrying and stacking robots 4, 4' of the two operation lines A, B respectively extend over the block loading station 1, 1' of the respective operation line A, B and the waiting station 1# of the corresponding moving quick table 10, 10' at the block loading station 1, 1' side, and also extend over the sheet unloading station 3', 3 of the other operation line B, A and the waiting station 2# of the corresponding moving quick table 10', 10 at the sheet unloading station 3', 3 side.

The carrying and stacking robots 4, 4' are each provided with an end effector 11, 11' for grasping a block and a sheet; and each of the cutting stations 2, 2' is provided with a waste material conveying system 12, 12'.

Further, the cutting station 2, 2' is provided with a replaceable liner die, wherein a support device is provided on the liner die below the positions corresponding to the sheets and the recyclable waste, and the rest of the liner die is a hollow left for blanking; a waste material chute for blanking is provided for the waste material conveying system 12, 12' at the lower part of the liner die, and a waste material conveying belt is provided corresponding to the waste material chute.

A waste material discharge port of the waste material conveying system 12, 12' is provided at a side of the moving quick table 10, 10'.

In this embodiment, two laser generators 14, 14' are provided corresponding to the two laser cutting heads 9, 9', so that two beams are transferred to the laser cutting heads. The laser generator 14, 14' is an optical fiber laser generator or a disc laser generator.

According to this embodiment, the cutting station 2, 2' is provided with a plurality of segmented flues 13, 13' for isolating and drawing away smoke by way of segmented opening and closing.

A metal plate cutting method of the present invention uses two longitudinally moving loading/unloading and cutting operation lines A, B arranged in parallel, each of the operation lines A, 13 comprising a block loading station 1, 1', a cutting station 2, 2', a sheet unloading station 3, 3', and a carrying and stacking robot 4, 4' with a corresponding external shaft 41, 41' arranged between the two operation lines A, B, which are arranged in succession, wherein the two operation lines A, B have block loading directions opposite to each other; the moving quick tables 10, 10' move longitudinally and allow feeding and discharging in two directions from two sides, and are each provided with two waiting stations (i.e., waiting stations 1# and 2#) and a cutting station; stacked blocks are carried by the block cart 5, 5' to the block loading station 1, 1', the carrying and stacking robot 4, 4' loads a block to the waiting station of the moving quick table 10, 10', and the moving quick table 10, 10' moves the block to the cutting station; the laser cutting head 9, 9' cuts the block along a predetermined cutting path, after cutting the moving quick table 10, 10' Moves a sheet out of the cutting station, the sheet is unloaded by the carrying and stacking robot 4, 4 to the sheet unloading station, stacked sheets are carried out of the operation region by the sheet cart 6, 6' along the guide rails, and the cut-away waste material is removed to the outside of the cutting station by the waste material conveying system 12, 12'.

Furthermore, according to the present invention, the external shafts 41, 41' of the two carrying and stacking robots 4, 4' respectively extend over the block loading station and the waiting station of the respective moving quick table; and the carrying and stacking robot of each operation line performs block loading and sheet unloading operations to the other operation line, so that the two operation lines share one sheet unloading station.

In addition, according to the present invention, the carrying and stacking robot 4, 4' can also be responsible for the block loading and sheet unloading operations at one side of the two moving quick tables 10, 10'.

A moving mechanism of the laser cutting head 9, 9' is in the form of a rectangular-coordinate robot, and is movable in X-, Y- and Z-direction.

The present invention is also provided with a safety enclosure for isolation of the entire system. The safety enclosure of equipment is open at the guide rails at the two sides and at the waste material discharge, for the carts to move in and out and for collecting waste materials; and a waste material box is provided at the waste material outlet.

FIG. 2 is a perspective schematic view according to an embodiment of the present invention, in which the moving mechanism of the laser cutting heads 9 and 9' is in the form of a rectangular-coordinate robot, and is movable in X-, Y- and Z-direction.

The working stroke of each laser cutting head is 4,000 mm long (X-axis)×2,000 mm wide (Y-axis)×400 mm thick (Z-axis).

The safety enclosure of equipment 5 is open at the guide rails at two sides for the block and sheet carts to travel through, and an open notch is provided at the waste material conveying system 12 for placing a waste tank 13 for discharging waste materials. This system occupies a total longitudinal length of 36 in, a total transverse length of 9 in, and a total area of 324 m². For the longitudinally moving quick tables, the spacing of the quick table guide rails is 2,000 mm, reducing the installation difficulty and better ensuring the operation performance of the system. FIGS. 3-10 are schematic diagrams of a process flow of the system of the present invention. This embodiment is designed for blocks of 3,700 mm×1,850 mm at maximum, so that the quick table has a size of 4000×2000 mm.

The block used in this embodiment is a body side outer panel single-sheet block, which has dimensions in length and width of 3,325 mm×1,580 mm, and from which one sheet is cut in one cutting operation.

Figure 3:
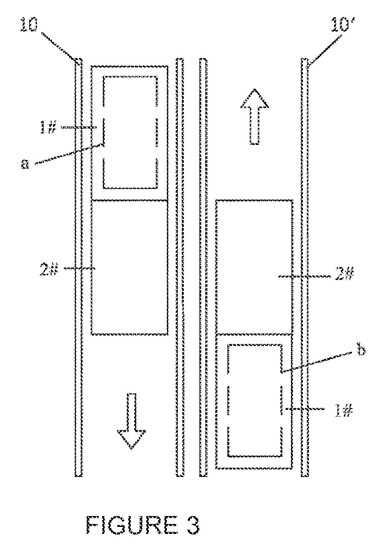
FIGS. 3-10 are schematic diagrams of a process flow according to an embodiment of the present invention.
Figure 4:
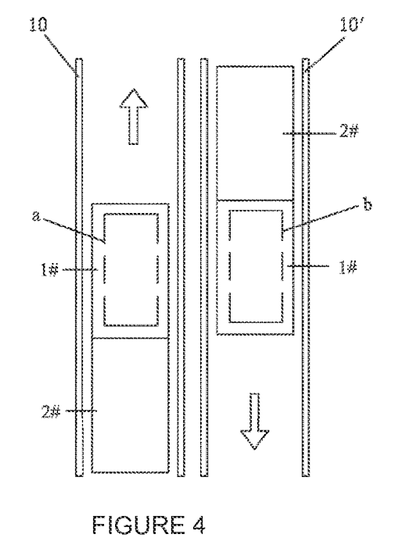

The work flow is as follows:

the carrying and stacking robots 4, 4' simultaneously pick up blocks a, b from the block stacking stations, and place them respectively at the waiting stations 1# of the moving quick tables 10, 10', as shown in FIG. 3, and the laser cutting heads 9, 9' are at the cutting stations. After loading, the two moving quick tables 10, 10' move such that the waiting stations 1# of the moving quick tables 10, 10' are at the cutting stations, as shown in FIG. 4.

Figure 5:
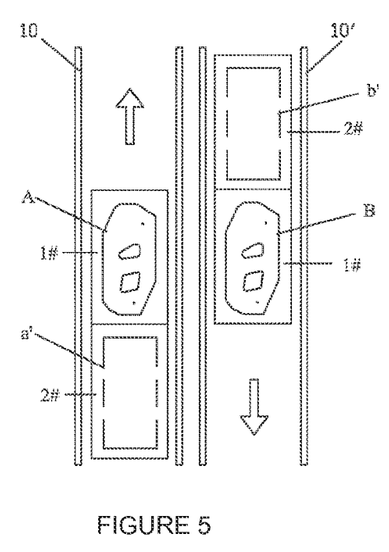

After loading, the carrying and stacking robots 4, 4' stand by at the unloading stations, preparing for a loading operation at the waiting stations 2# of the moving quick tables 10, 10'. The two laser cutting heads 9, 9' perform a laser cutting operation on the blocks a, b at the two cutting stations along a predetermined cutting path. Meanwhile, the carrying and stacking robots 4, 4' grasp blocks a', b' from the block loading stations 1, 1' and place them at the waiting stations 2# of the moving quick tables 10, 10', as shown in FIG. 5.

Figure 6:
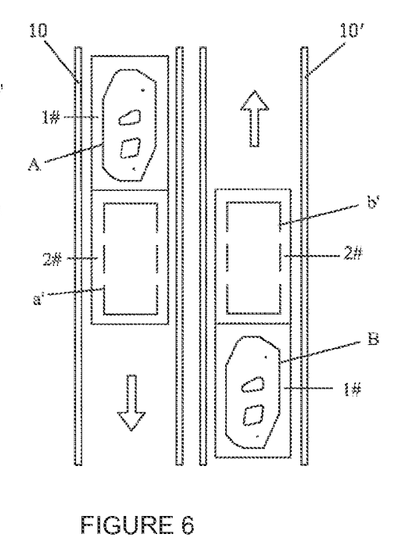

The two laser cutting heads 9, 9' at the cutting stations finish cutting the blocks a, b at the waiting stations 1# of the moving quick tables 10, 10', and then the two moving quick tables move. The waiting stations 2# of the moving quick tables 10, 10' move to the cutting stations, and the laser cutting heads 9, 9' perform a laser cutting operation on the blocks a', b' at the waiting stations 2# along a predetermined cutting path. Meanwhile, the carrying and stacking robots 4, 4' take the sheets A, B obtained after cutting the blocks a, b from the waiting stations 1# and stack them, as shown in FIG. 6.

Figure 7:
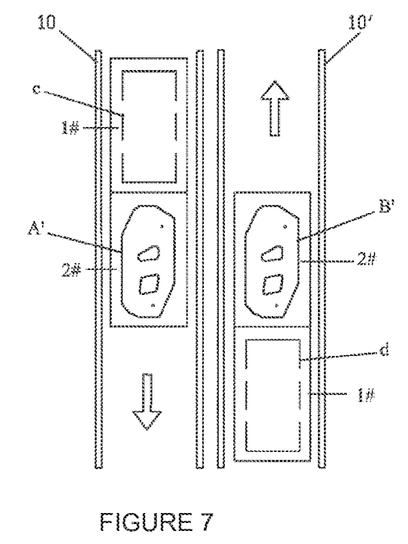

After stacking, the carrying and stacking robots take blocks c, d from the block stacking stations, respectively, to the waiting stations 1# of the moving quick tables 10, 10'. Meanwhile, the laser cutting heads 9, 9' finish cutting the blocks a', b' at the waiting stations 2#, as shown in FIG. 7.

Figure 8:
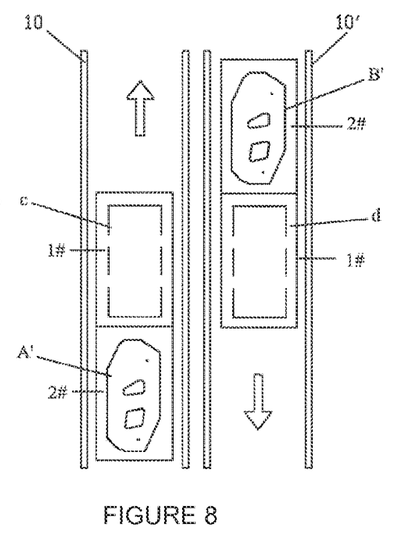

The two laser cutting heads 9, 9' at the cutting stations finish cutting the blocks at the waiting stations 2# of the moving quick tables 10, 10', and the two moving quick tables 10, 10' move such that the waiting stations 1# of the moving quick tables 10, 10' are at the cutting stations, as shown in FIG. 8.

Figure 9:
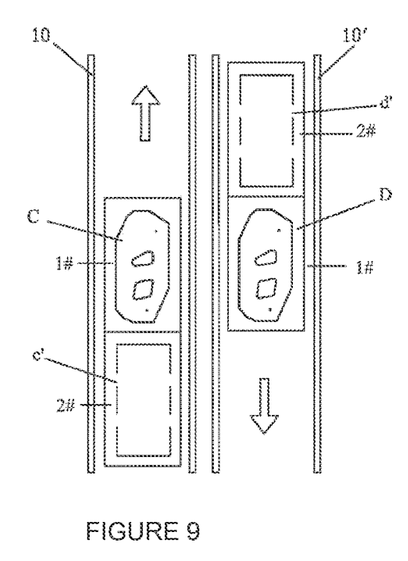

The two laser cutting heads 9, 9' perform a laser cutting operation on the blocks c, d at the waiting stations 1# of the moving quick tables 10, 10' along a predetermined cutting path. Meanwhile, the carrying and stacking robots 4, 4' respectively take the sheets A', B' obtained after cutting the blocks a', b' from the waiting stations 2# of the moving quick tables 10, 10' and stack them, and after stacking, the carrying and stacking robots 4, 4' grasp the blocks c', d' from the block loading stations 1, 1' and place them at the waiting stations 2# of the moving quick tables 10, 10', as shown in FIG. 9.

Figure 10:
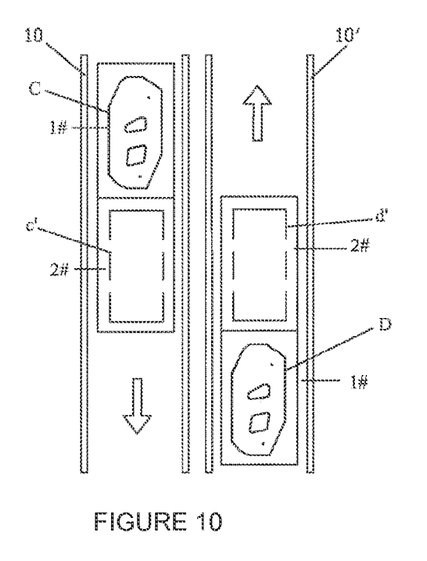

The two laser cutting heads 9, 9' at the cutting stations finish cutting the blocks c, d at the waiting stations 1# of the moving quick tables 10, 10', the two moving quick tables move such that the waiting stations 2# of the moving quick tables 10, 10' are at the cutting stations, and the sheets C, D obtained after cutting the blocks c, d at the waiting stations 1# of the moving quick tables 10, 10' are moved to the sheet stacking stations, as shown in FIG. 10, and are conveyed by the carrying and stacking robots 4, 4' to the sheet unloading stations 3, 3'.

Thus, the two cutting stations on the two moving quick tables 10, 10' move in an alternating and reciprocating manner, and while the two laser cutting heads 9, 9' perform a cutting operation at the respective cutting stations 2, 2', the two carrying and stacking robots 4, 4' are responsible for the block loading and sheet unloading operations of the two moving quick tables 10, 10' in the respective directions.

After the completion of cutting blocks at two sides of the robot, the block cart and the sheet cart move out of the cutting region, a new batch of blocks is supplied, the blocks are put in place, the sheet cart gets ready, and a new round of cutting operation starts, i.e., the process starting as shown in FIG. 3 is repeated until the cutting of blocks at two sides of the carrying and stacking robot is completed, i.e., stacking is ended.

What is claimed is:

1. A metal plate cutting system, comprising two longitudinally moving loading/unloading and cutting operation lines arranged in parallel, each of the operation lines comprising a block loading station, a cutting station, a sheet unloading station, and a carrying and stacking robot with a corresponding external shaft disposed between the two operation lines, which are arranged in succession, wherein the block loading stations of the two operation lines are disposed in opposite directions;

wherein the block loading station and the sheet unloading station are respectively provided with a block cart and a sheet cart and corresponding guide rails;

wherein the cutting station is provided with at least one laser generator, two laser cutting heads, and moving quick tables for moving blocks and sheets into and out of a cutting region of the laser cutting head; the moving quick tables move longitudinally and allow feeding and discharging in two directions, and are each provided with two waiting stations and a cutting station therebetween;

wherein the external shafts of the carrying and stacking robots of the two operation lines respectively extend over the block loading station of the respective operation line and one waiting station of the corresponding moving quick table at the block unloading station side and correspondingly, also extend over the sheet unloading station of the other operation line and one waiting station of the corresponding moving quick table at the sheet unloading station side; and wherein the carrying and stacking robots are each provided with an end effector for grasping a block and a sheet; and each cutting station is provided with a waste material conveying system.

2. The metal plate cutting system of claim 1, wherein the waste material conveying system comprises a waste material chute for blanking and a waste material conveying belt.

3. The metal plate cutting system of claim 1, wherein the waste material discharging direction of the waste material conveying system is perpendicular to the moving direction of the moving quick table.

4. The metal plate cutting system of claim 1, wherein there are two laser generators each corresponding to one laser cutting head.

5. The metal plate cutting system of claim 1, wherein the laser generator is an optical fiber laser generator or a disc laser generator.

6. The metal plate cutting system of claim 1, wherein the cutting station is provided with at least one segmented flue for isolating and drawing away smoke by way of segmented opening and closing.

7. A metal plate cutting method, using two longitudinally moving loading/unloading and cutting operation lines arranged in parallel, each of the operation lines comprising a block loading station, a cutting station, a sheet unloading station, and a carrying and stacking robot disposed between two operation lines, which are arranged in succession, wherein the two operation lines have block loading directions opposite to each other; the block loading station and the sheet unloading station are respectively provided with a block cart and a sheet cart and corresponding guide rails; the cutting station is provided with at least one laser generator, two laser cutting heads, and a moving quick table for moving blocks and sheets into and out of a cutting region; the moving quick tables move longitudinally and allow feeding and discharging in two directions from two sides, and are each provided with two waiting stations and a cutting station; stacked blocks are carried by the block cart to the block loading station, the carrying and stacking robot loads a block to a waiting station of the moving quick tables, and the moving quick tables move the block to the cutting station; and the laser cutting head cuts the block along a predetermined cutting path, the moving quick table moves a sheet out of the cutting station after cutting, the carrying and stacking robot unloads the sheet to the sheet unloading station, stacked sheets are carried out of the operation region by the sheet cart along the guide rail, and the cut-away waste material is removed to the outside of the cutting station by a waste material conveying system.

8. The metal plate cutting method of claim 7, wherein the external shafts of the two carrying and stacking robots respectively extend over the block loading station of the respective operation line and the waiting station of the corresponding moving quick table at the block loading station side; and the carrying and stacking robot of each operation line performs block loading and sheet unloading operations to the other operation line, so that the two operation lines share one sheet unloading station or one block loading station.

9. The metal plate cutting method of claim 7, wherein either of the carrying and stacking robots of the two operation lines is responsible for the block loading and sheet unloading operations at one side of the two moving quick tables.

10. The metal plate cutting method of claim 7, wherein a waste material discharge port of the waste material conveying system is provided at a side of the moving quick table.

11. The metal plate cutting method of claim 7, wherein a moving mechanism of the laser cutting head is in the form of a rectangular-coordinate robot, and is movable in X-, Y- and Z-direction.

* * * * *

UNITED STATES PATENT AND TRADEMARK OFFICE
CERTIFICATE OF CORRECTION

PATENT NO. : 9,700,962 B2
APPLICATION NO. : 14/759461
DATED : July 11, 2017
INVENTOR(S) : Saidan Yang et al.

It is certified that error appears in the above-identified patent and that said Letters Patent is hereby corrected as shown below:

In the Specification

Column 4, Line 64, "13" should read --B--.

Column 5, Line 15, "4, 4" should read --4, 4'--.

Column 5, Line 55, "36 in" should read --36 m--.

Column 5, Line 55, "9 in" should read --9 m--.

Signed and Sealed this
Twenty-sixth Day of March, 2019

Andrei Iancu
*Director of the United States Patent and Trademark Office*